May 23, 1972 — A. H. KRUEGER — 3,664,618
DUAL-PURPOSE BASE FOR USE AS A SIGN SUPPORT OR TO
FORM A VEHICLE BARRICADE
Filed June 19, 1970
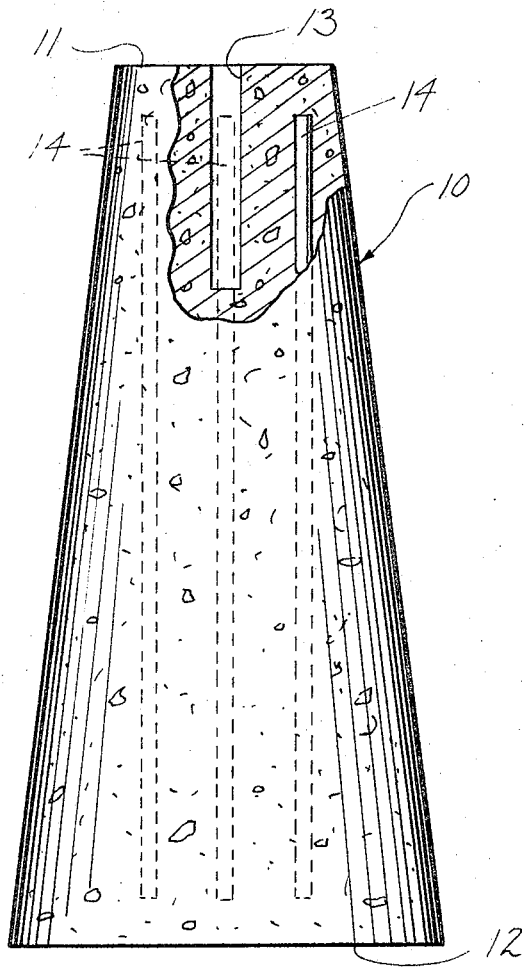
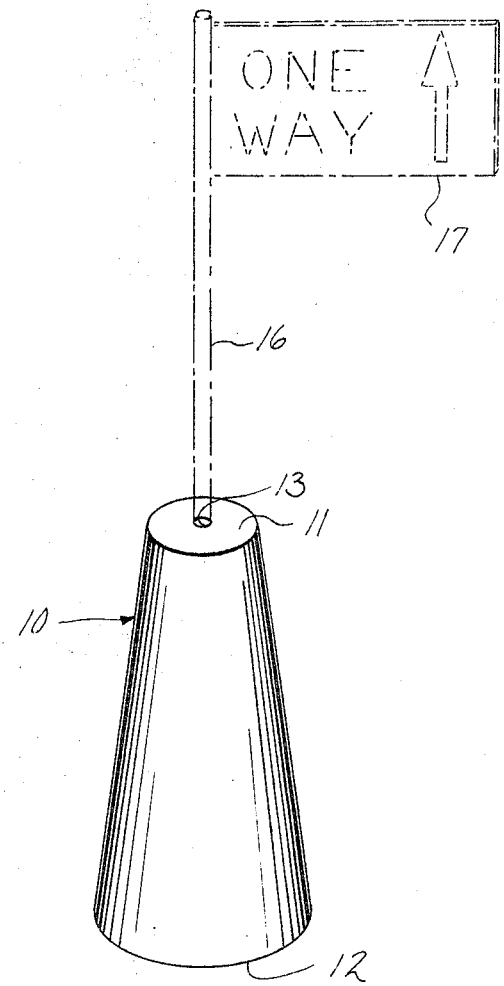
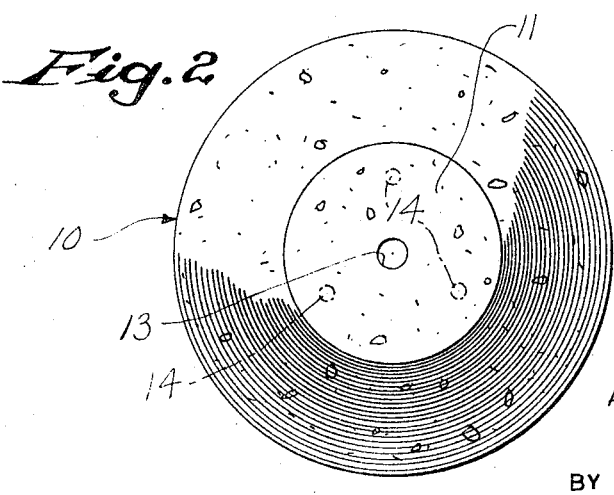
INVENTOR
ALFRED H. KRUEGER
BY
Morsell & Morsell
ATTORNEYS May 23, 1972  A. H. KRUEGER  3,664,618
DUAL-PURPOSE BASE FOR USE AS A SIGN SUPPORT OR TO
FORM A VEHICLE BARRICADE
Filed June 19, 1970  2 Sheets-Sheet 2
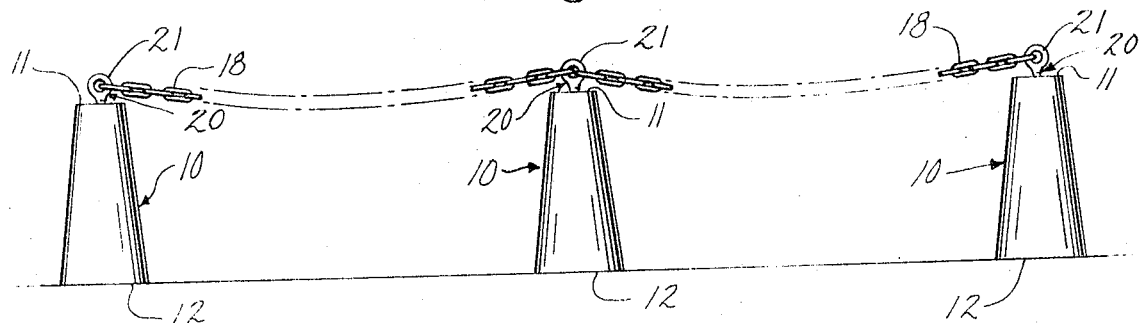
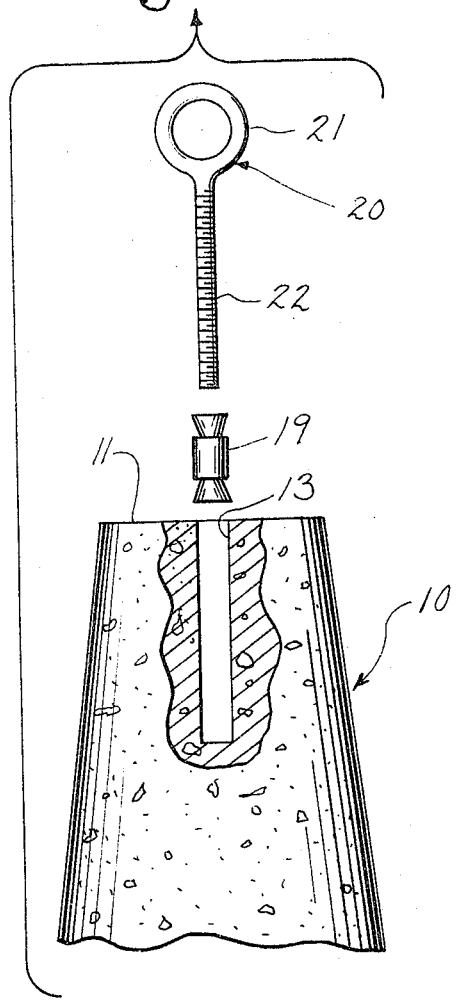
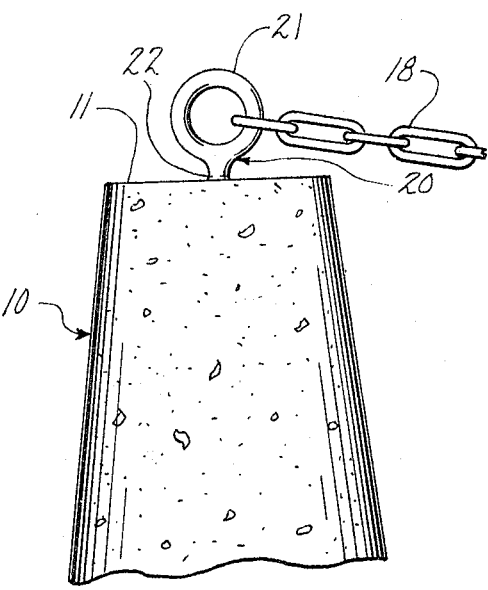
INVENTOR
ALFRED H. KRUEGER
BY
*Morsell & Morsell*
ATTORNEYS United States Patent Office 3,664,618
Patented May 23, 1972

3,664,618
DUAL-PURPOSE BASE FOR USE AS A SIGN SUPPORT OR TO FORM A VEHICLE BARRICADE
Alfred H. Krueger, Palmyra, Wis., assignor to
A. H. Krueger Inc., Milwaukee, Wis.
Filed June 19, 1970, Ser. No. 47,753
Int. Cl. G09f 17/00
U.S. Cl. 248—44          1 Claim

ABSTRACT OF THE DISCLOSURE

A frusto-conical precast concrete base member which is portable but of sufficient weight to form a semi-permanent installation is provided with a vertical bore in its top surface into which a staff or rod can be removably inserted to permit the use of the unit as a support for an indicator sign or flag in parking areas or the like, or permitting the mounting of an eye bolt therein and the fastening of chains or the like between a plurality of said base members to form a temporary or permanent vehicle barricade.

BACKGROUND OF THE INVENTION

Field of the invention

The present invention relates to the field of sign standards and barriers of the type used in parking lots and the like, and more particularly to a versatile new dual-purpose base member which can be interchangeably used as a sign support or as an integral member of a vehicle barricade assembly.

Description of the prior art

Most commercial and industrial parking lots and garages, as well as residential parking facilities, use wooden or metal sign standards or barriers for indicating desired directional patterns or parking lanes or areas, but, unfortunately, such conventional sign or barricade members are not entirely satisfactory for their intended purposes. For one thing, the high cost of all-metal units is practically prohibitive, and, in addition, such metal units are quickly rusted and ruined when used out of doors. Moreover, wooden sign and standard assemblies are relatively light in weight and unless they are permanently anchored to the ground they are easily knocked over and broken or ruined, as well as being readily inadvertently moved about and misplaced. Further, if such wooden sign units are permanently anchored in the ground they cannot be relocated when desired, as is sometimes necessary to accommodate particular parking requirements. In addition, such conventional wooden sign or barrier units are susceptible to rottting and deterioration from the elements and are relatively quickly ruined by rain and snow, and they are easily damaged when accidentally bumped by a vehicle, which is practically unavoidable in commercial parking facilities.

As will be hereinafter seen, the novel and improved base unit comprising the present invention largely eliminates the above shortcomings and disadvantages of the sign and barricade devices heretofore used.

SUMMARY OF THE INVENTION

The present invention provides a novel dual-purpose precast concrete base member which can be interchangeably used either as a sign base or as an integral member of a chain barricade of the type commonly utilized in commercial or residential parking areas, either outdoor or indoor. In addition, said unit is portable so that it can be relocated when desired, but it is of sufficient weight to form a semi-permanent installation that cannot be easily accidentally knocked over or broken by a vehicle, as frequently occurs with the wooden devices presently employed for the same purposes.

A more specific object of the invention is to provide a novel and versatile precast concrete base member having an opening in its top surface into which a directional sign or flag staff can be removably inserted, or which is adapted to receive an eye bolt to which chains or the like can be fastened to form an economical vehicle barricade.

A further object of the invention is to provide a novel dual-purpose base member as described which is precast of a specially-formulated concrete combining attractive appearance with a rugged durability well adapted to withstand both the elements and unavoidable accidental contact and bumps by vehicles.

A further object of the invention it to provide a versatile concrete base member as described which is tapered in shape to provide a unit which is not only unique and attractive in appearance, but which can be tipped and readily manually rolled along its bottom edge when it is desired to move or relocate the same.

A further object of the invention is to provide a dual-purpose base member which is frusto-conical in shape, as described, thereby providing a unit which is extremely stable and unlikely to be knocked over if accidentally bumped by a vehicle.

A further object is to provide a base member which is precast of concrete, as described, thereby providing a unit which is not only much stronger and more durable than conventional wooden sign standards, but which is substantially less expensive than all-metal units intended for the same purposes.

A still further object of the present invention is to provide a novel dual-purpose precast concrete base member which is designed particularly for use in commercial or residential parking lots or garages, as described, but which novel unit can also be advantageously utilized for diverse other applications requiring a sign or barrier base unit.

BRIEF DESCRIPTION OF THE INVENTION

In the accompanying drawings, illustrating one preferred embodiment of the present invention, and wherein the same reference numerals designate the same parts in all of the views:

FIG. 1 is a side elevational view of the improved base member with a portion thereof broken away and shown in section;

FIG. 2 is a top plan view of the base member;

FIG. 3 is a perspective view of the base member, and showing, in dot and dash lines, a directional sign mounted therein;

FIG. 4 is an elevational view showing a plurality of said base members with chains extending therebetween to form a vehicle barricade;

FIG. 5 is an enlarged fragmentary elevational view of the base member, with a portion thereof broken away and shown in section, and illustrating, in exploded relationship, the eye bolt assembly employed when the unit is to be used with chains to form a vehicle barricade; and FIG. 6 is a fragmentary elevational view of the unit illustrated in FIG. 5 in its assembled condition.

DESCRIPTION OF THE PREFERRED EMBODIMENT

Referring now more particularly to the drawings, the novel dual-purpose base member featured in the present invention is designated generally by the reference numeral 10. As illustrated, said base member 10 is frusto-conical in form, being tapered upwardly from its bottom at about a 10° angle. Said base includes flat top and bottom surfaces 11 and 12, respectively, and formed in the center of said top surface is a vertical bore 13 which extends downwardly about 10½ inches. In the preferred form of the invention said top surface 11 is approximately nine inches in diameter while the bottom has a diameter of approximately eighteen inches, the entire unit standing about thirty-six inches in height. It is to be understood, of course, that while a unit of the size described has been found to provide excellent results, the dimensions of said base member can be varied as desired and the particular figures listed are by no means critical to the invention.

Said base member 10 is preferably precast of six bag air-entrained, vibrated concrete formulated to prevent cracking or spalling even when subjected to snow, ice, or other adverse weather conditions, and three equally spaced, vertically-disposed steel reinforcing rods 14 are ordinarily embedded in said base for added strength.

Preferably said base unit 10 is approximately 450 pounds in weight, thereby providing a device which is heavy enough to function as a permanent or semi-permanent installation if desired, but which unit is not anchored to the ground and can be moved about or relocated when required. Due to the novel upwardly-tapered shape of said base member when it is desired to move the same it can be tipped and easily manually rolled about on its bottom peripheral edge despite its considerable weight.

As hereinabove described, formed in the top surface 11 of said base member 10 is a vertical bore 13. In the preferred embodiment of the invention said bore is approximately one inch in diameter and 9½ inches in depth. It is to be emphasized again, however, that the specific dimensions recited herein are merely representative of one possible form of the invention, and the invention is by no means to be limited or confined to exact dimensions or specifications recited. On the contrary, what is intended to be covered herein is not only the illustrated form of the invention but also any and all variations or modified forms thereof as may come within the spirit of said invention.

In the use of the base member 10 as a support for a directional indicator or the like in a parking area, and referring now more particularly to FIG. 3 of the drawings, a rod or staff 16 having a directional sign 17 or flag thereon can be inserted into the bore 13 in the top of said base 10. Thus there is provided a solid and stable sign assembly which is not likely to be inadvertently knocked over or damaged by a vehicle, in contrast to the wooden sign standards ordinarily used. Moreover, as hereinabove mentioned, and in contrast to wooden sign posts which are permanently anchored in the ground, if it should be desired to move or relocate the sign this can be readily accomplished merely by tipping and rolling the base member on its bottom edge. A further advantage of the present sign unit is that if it should be desired to change the particular sign 17 carried thereby the rod 16 can be manually withdrawn from the bore 13 and replaced therein with any desired sign, flag, or other type of indicator.

With reference now to FIG. 4 of the drawings, in addition to its use as a base for directional signs and the like, the novel dual-purpose base member 10 comprising the present invention can also be utilized when it is desired to erect a vehicle barricade of the type commonly utilized to block off a drive or particular portion of a parking area. For this purpose a plurality of said base members 10 are positioned in spaced relationship across the area to be blocked off, and chains 18 fastened therebetween.

As shown in FIGS. 5 and 6, when it is desired to secure barricade chains to the base 10 an expansion shield 19 is first inserted into the bore 13 in the top of said base member, which expansion shield devices are well known in the art, and the threaded shaft 22 of an eye bolt 20 is screwed downwardly therein, said shield 19 expanding as the bolt shaft moves downwardly therein to tightly grip the inner surface of said bore and securely retain said eye bolt therein. One end of a chain 18 (FIG. 6) may then be fastened to the eye 21 of said bolt, and the opposite chain end similarly secured to another, spaced base member 10. The result is an inexpensive barricade assembly whereby chains or ropes or the like can be quickly and easily installed to block off any desired area. Due to the movable nature of the novel base member 10 comprising the present invention the barricade can be shifted or relocated when desired, or it can be disassembled merely by removing the chains and withdrawing the eye bolts 20 from said base members.

From the foregoing detailed description it will be seen that the present invention provides a unique and versatile new base member for signs or barricade chains or the like having a number of advantages over the devices heretofore used for the same purposes. The present precast concrete unit is substantially less expenive than all-metal sign units, of course, and will not rust when subjected to rain or snow. Moreover, said concrete unit is much more durable and long-lasting than wooden sign standards or barricades, and because of its substantial weight the present unit can function as a permanent or semi-permanent installation. Despite its weight, however, because of its unique tapered shape the present base member can be tipped and easily manually rolled about when it is desired to relocate the same.

Further important advantages of the present invention, in contrast to the wooden devices customarily utilized for the same purposes, are that said frusto-conically shaped precast concrete unit is stable and not likely to be knocked over or damaged by vehicles, and it is attractive in appearance and not offensive to any kind of landscaping or architecture, thus lending itself to use on commerical, industrial, or even residential property.

One of the most important features of the present base unit, of course, is its versatility, said unit being adapted to accommodate either directional signs or flags, or being readily adaptable to have chains or the like secured thereto when it is desired to form either a temporary or permanent vehicle barricade.

As hereinabove mentioned, while the present invention has been designed particularly for use in commercial or residential parking areas for vehicles, it could also be advantageously utilized for numerous other installations requiring sign standards or barricades, and the invention is not to be limited in this respect. Similarly, while a preferred design of the invention has been illustrated and described herein, including specific dimensions, it is to be clearly understood that the invention is intended to cover and include not only the illustrated form thereof, but also any and all variations or modified forms of said base member as may come within the spirit of the invention.

What I claim is:

1. A dual-purpose base member designed for interchangeable use as a sign support for parking areas or as an integral component of a vehicle barricade assembly, comprising: a frusto-conically shaped base member formed of precase concrete, said base member having a flat top surface and having a flat, ground-engaging bottom surface at least twice the diameter of said top surface, said base member being tapered upwardly at an angle of less than 15° and standing at least three feet in height; a plurality of equally-spaced, substantially vertically-disposed elongated steel reinforcing rods embedded in said concrete base member; and a vertical bore formed in the center of and flush with the top surface of said base member and extending downwardly therein a distance less than one-third of the height of said base member, said bore being adapted to have an indicator sign post or flagstaff removably and interchangeably inserted therein, and said bore being adapted to contain means designed to receive the threaded shaft on an eye bolt to which connecting elements can be attached and extended between a plurality of said base members to form a vehicle barricade, said concrete base member forming a semi-permanent installation which cannot be readily inadvertently shifted or knocked over by a vehicle, but which base member, due to its shape, is adapted to be manually tipped and rolled on its bottom peripheral edge when it is desired to move or relocate the same.

References Cited
UNITED STATES PATENTS

| | | | |
|---|---|---|---|
| 2,292,505 | 8/1942 | Black | 248—44 |
| 2,625,130 | 1/1953 | Moner | 116—63 P |
| 3,305,990 | 2/1967 | Hagely | 248—44 X |
| 3,081,054 | 3/1963 | Westervelt | 248—44 |
| 3,499,413 | 3/1970 | Heard | 94—1.5 X |

WILLIAM H. SCHULTZ, Primary Examiner

U.S. Cl. X.R.

116—63